(12) United States Patent
Ligthelm

(10) Patent No.: US 7,243,720 B2
(45) Date of Patent: Jul. 17, 2007

(54) INHIBITING BREAKTHROUGH OF DRIVING FLUID VIA A PERMEABLE GEOLOGICAL LAYER INTO AN OIL PRODUCTION WELL

(75) Inventor: Dirk Jacob Ligthelm, Rijswijk (NL)

(73) Assignee: Shell Oil Company, Houston, TX (US)

( * ) Notice: Subject to any disclaimer, the term of this patent is extended or adjusted under 35 U.S.C. 154(b) by 69 days.

(21) Appl. No.: 10/534,179

(22) PCT Filed: Nov. 5, 2003

(86) PCT No.: PCT/EP03/50792

§ 371 (c)(1),
(2), (4) Date: May 5, 2005

(87) PCT Pub. No.: WO2004/042187

PCT Pub. Date: May 21, 2004

(65) Prior Publication Data

US 2006/0157238 A1    Jul. 20, 2006

(30) Foreign Application Priority Data

Nov. 6, 2002    (EP) .................................. 02079632

(51) Int. Cl.
*E21B 43/22*    (2006.01)
(52) U.S. Cl. .................... 166/270; 166/252.5; 166/400
(58) Field of Classification Search .................... None
See application file for complete search history.

(56) References Cited

U.S. PATENT DOCUMENTS

| 2,042,011 | A |   | 5/1936 | Loomis |        |
|-----------|---|---|--------|--------|--------|
| 2,786,530 | A | * | 3/1957 | Maly ........................... | 166/270 |
| 3,285,338 | A | * | 11/1966 | Boston ........................ | 166/270 |
| 3,349,844 | A |   | 10/1967 | Rhea et al. |  |
| 3,386,509 | A | * | 6/1968 | Froning ....................... | 166/292 |
| 3,396,790 | A | * | 8/1968 | Eaton .......................... | 166/270 |
| 3,658,131 | A |   | 4/1972 | Biles |  |
| 3,881,552 | A |   | 5/1975 | Hessert |  |

(Continued)

FOREIGN PATENT DOCUMENTS

FR    2671132    7/1992

OTHER PUBLICATIONS

International Search Report dated Mar. 11, 2004.

(Continued)

*Primary Examiner*—Zakiya Bates
*Assistant Examiner*—Angela DiTrani

(57) ABSTRACT

A method for selectively reducing the permeability of one or more relatively permeable geological layers of an oil-bearing formation, to inhibit breakthrough of driving fluid from a driving fluid injection well via at least one of said layers into an oil production well, which method comprises the steps of injecting a driving fluid comprising a first compound into the formation via the injection well; detecting the first compound in well fluid of the oil production well; upon detection, injecting a second compound into the formation via the oil production well, to react with the first compound in order to provide a flow restriction generated by a third compound which comprises a reaction product of the first and second compounds in at least one relatively permeable geological layer through which breakthrough of the driving fluid into the oil production well has occurred.

16 Claims, 1 Drawing Sheet

U.S. PATENT DOCUMENTS

| | | | | |
|---|---|---|---|---|
| 3,958,638 A | * | 5/1976 | Johnston | 166/294 |
| 4,004,639 A | | 1/1977 | Sandiford | |
| 4,031,958 A | | 6/1977 | Sandiford et al. | 166/270 |
| 4,147,211 A | * | 4/1979 | Sandiford | 166/270 |
| 4,299,284 A | | 11/1981 | Brown et al. | |
| 4,438,976 A | | 3/1984 | Baughman et al. | 299/4 |
| 4,903,767 A | * | 2/1990 | Shu et al. | 166/270 |
| 4,915,170 A | * | 4/1990 | Hoskin | 166/270 |
| 4,940,091 A | | 7/1990 | Shu et al. | 166/270 |
| 4,981,176 A | | 1/1991 | Hurd | 166/273 |
| 5,181,568 A | | 1/1993 | McKown et al. | 166/293 |
| 5,291,949 A | * | 3/1994 | Dovan et al. | 166/295 |
| 5,358,565 A | | 10/1994 | Shu | 106/634 |
| 5,363,914 A | | 11/1994 | Teletzke | 166/272 |
| 5,513,705 A | | 5/1996 | Djabbarah et al. | |
| 5,834,406 A | | 11/1998 | Sydansk | 507/202 |
| 6,024,167 A | | 2/2000 | Irani | 166/270 |
| 6,228,812 B1 | | 5/2001 | Dawson et al. | 507/221 |

OTHER PUBLICATIONS

Schlumberger Glossary, Online: URL:http://www.glossary.oilfield.slb.com/alkaline flooding.

Schlumberger Glossary, Online: URL:http://www.glossary.oilfield.slb.com/waterflood.

Fundamentals of Reservoir Engineering by L.P. Dake, Developments in Petroleum Science 8, Elsevier, 1978, pp. 121-126.

* cited by examiner

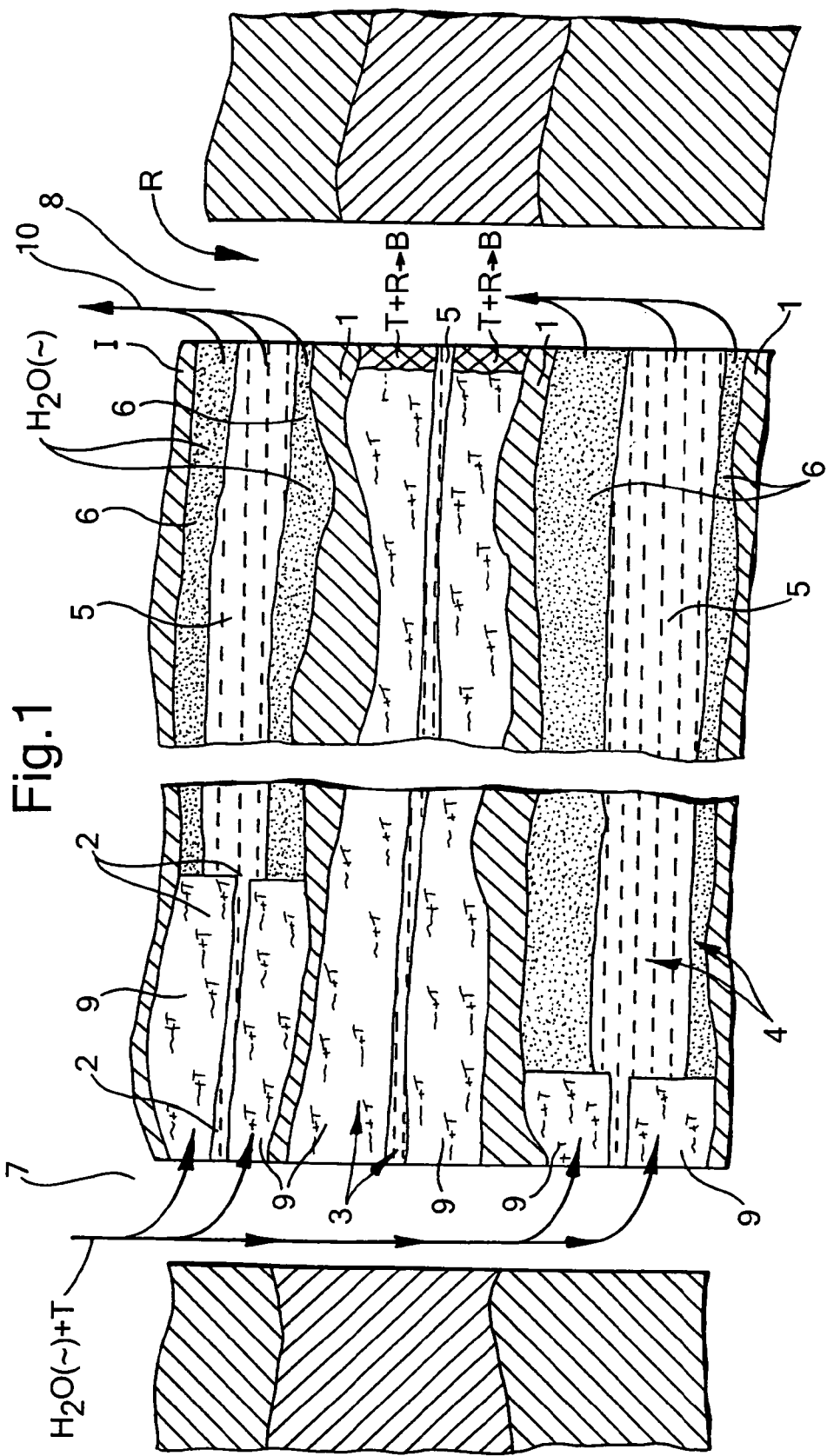

INHIBITING BREAKTHROUGH OF DRIVING FLUID VIA A PERMEABLE GEOLOGICAL LAYER INTO AN OIL PRODUCTION WELL

PRIORITY CLAIM

The present application claims priority on European Patent Application 02079632.2 filed 6 Nov. 2002.

FIELD OF THE INVENTION

The invention relates to a method for inhibiting breakthrough of driving fluid via a relatively permeable geological layer of a stratified oil-bearing formation into an oil production well. More particularly, the invention relates to a method for reducing the permeability of one or more relatively permeable geological layers of an oil field, which oil field comprises at least one oil production well and at least one injection well. In a stratified oil-bearing formation several oil-bearing layers may be isolated by substantially impermeable layers, such as shale barriers.

BACKGROUND OF THE INVENTION

When producing oil from an oil field, water and/or steam may be injected into the injection well to drive the production of oil. The oil is pressed by the water, steam, steam foam or froth and/or other driving fluid through the geological layers into the oil production well, thereby enhancing the production of crude oil. Stimulation of oil production by injection of driving fluid into the formation is a technology used in so-called Improved Oil Recovery (IOR).

In a stratified oil-bearing formation the permeability of different geological oil-bearing layers may differ, which has as result that injected water will reach the production well initially through the most permeable layer, before a substantial amount of the oil of the other, less permeable, layers is retrieved. This breakthrough of injection water is a big disadvantage, as the water/oil ratio retrieved from the production well will rapidly increase and become more and more unfavourable during the lifetime of the oil field.

It is known in the art to insert an annular plug in an inflow region of an oil production well to shut off the layer with the injection water break-through. Such an annular plug can be applied by locally providing a cement lining, which seals off the respective layer. It is however difficult to determine the position of this layer, such that generally several attempts have to be made before the flow of the layer is reduced. In some circumstances however the water producing layer cannot be identified and/or the placement of a cement plug cannot be performed.

U.S. Pat. No. 5,291,949 discloses a method to inhibit a caustic flood breakthrough at a production well. When a caustic flood occurs or is imminent at the production well, three slugs of fluid are injected into the formation via the production well. First, a slug of a spacer fluid such as oil or other hydrocarbon. Second, an acidic solution comprising a crosslinkable polymer and a lanthanide. And third, another oil or hydrocarbon spacer fluid to displace and push the second fluid into the formation. When the caustic flood contacts the acidic solution inside the formation, the pH of the solution is raised. At the raised pH the lanthanide can crosslink the polymer to form a gel, which inhibits the caustic flood from reaching the production well.

The known method is expensive and complicated. Expensive chemicals (polymer and lanthanide) are used in the second fluid and the use of spacer fluids is required so as to arrange that a cross-linking reaction of the polymer occurs upon raising of the pH.

It is therefore an object of the invention to provide a method, which alleviates the above mentioned disadvantages.

SUMMARY OF THE INVENTION

According to the present invention there is provided a method for selectively reducing the permeability of one or more relatively permeable geological layers of an oil-bearing formation, to inhibit breakthrough of driving fluid from a driving fluid injection well via at least one of said layers into an oil production well, which method comprises the steps of:

injecting a driving fluid comprising a first compound into the formation via the injection well;

detecting the first compound in well fluid of the oil production well;

upon detection, injecting a second compound into the formation via the oil production well, to react with the first compound in order to provide a flow restriction generated by a third compound which comprises a reaction product of the first and second compounds in at least one relatively permeable geological layer through which breakthrough of the driving fluid into the oil production well has occurred.

As soon as the first, trigger, compound is detected in the well fluid of the production well, it is clear that a driving fluid (e.g. injection water) break-through has occurred. By injecting a second compound via the production well into the formation, which second compound is reactive with regard to the first, trigger, compound, the two compounds will react with each other forming a reaction product. By means of this reaction product a seal can be provided solely in the area of the break-through, i.e. in the highly permeable geological layer(s) near the production wellbore.

In an embodiment of the present invention, no spacer fluids are injected from the oil production well. Because the two reacting compounds are separate from each other until they are brought into contact, there is no risk of an uncontrolled premature sealing reaction.

This method results in a very efficient seal, which does not influence the production of crude oil and associated natural formation water from the other layers.

Preferably the first, trigger, compound is inert relative to the compounds present in the oil field. This will provide for an optimal reaction with the second compound.

Normally, the driving fluid (first fluid) comprising the first compound layer will have a higher mobility in the highly permeable geological layer than formation fluid produced from the adjacent oil-bearing geological layers. In some embodiments, a second fluid comprising the second compound is injected via the production well, which second fluid has a mobility intermediate between the mobility of the formation fluid and of the driving fluid. Then, when production is resumed in the production well after injection of the second fluid with the second compound, the well fluid from the oil-bearing geological layers pushes the second fluid back into the production wellbore. In the highly permeable layer, on the other hand, a good mixing of the more mobile driving fluid with the less mobile second fluid is achieved (also referred to as fingering), so that the reaction can take place. Depending on the speed of reaction, it may be desired to stop or limit the production again for a while, to allow the reaction to take place in the highly permeable geological layer.

Mobility m of a fluid in a porous medium is suitably defined as in the textbook "Fundamentals of Reservoir Engineering" by L. P. Dake, Developments in Petroleum Science 8, Elsevier, 1978, (see in particular pages 121-126), by the equation $m=k.k_r/\mu$. In this equation, $\mu$ is the dynamic viscosity of the fluid. k is the absolute permeability of the porous medium (formation layer). $k_r$ is the dimensionless relative permeability of the fluid in the medium which accounts for the situation that there is another fluid co-existent in the porous medium so that the fluid considered saturates only part of the pore volume in the porous medium. The maximum relative permeability of a fluid that can naturally occur, due to effects of residual saturation of another fluid in the porous medium, is referred to as end-point relative permeability, and is generally a number between 0 and 1 when the relative permeability is defined as a fraction of the absolute permeability.

In an embodiment of the method according to the invention the first, trigger, compound comprises an alkaline material and the second compound comprises iron chloride. This is a cost effective solution for a method according to the invention.

In another embodiment the second compound further comprises hydrochloric acid, corrosion inhibitor and/or flocculent, such as a low molecular weight poly acryl amide (PAA) or partially hydrolyzed poly acryl amide (PHPAA).

In another embodiment of the method according to the invention the first, trigger, compound is encapsulated. This provides a solution for the case that the first compound reacts with compounds in the geological layers during passage from the injection well to the oil production well. The release of the first compound out of the capsule can be triggered by for example lowering the pH in the production well. This reduction in pH could be the result of injecting the second compound.

The invention in some embodiments further relates to a kit of compounds comprising a first compound for injection into a subsurface formation via an injection well which first compound can pass through the formation concurrently with a driving fluid, and a second compound for injection into the formation via a production well, which second compound can react with the first compound so as to form a reaction product in the formation which imposes a flow restriction.

DETAILED DESCRIPTION OF THE INVENTION

In FIG. 1 a schematic view of an oil field with an oil-bearing formation formed of several geological layers is shown, at the hand of which an embodiment of the method according to the invention will be explained.

In the drawing a number of substantially impermeable shale layers 1 is shown with three interposed oil and formation water containing layers 2, 3, 4. The oil and water containing layers 2, 3, and 4 have different permeabilities. The intermediate oil and water containing layer 3 has the highest permeability and the lowermost oil and water containing layer 4 has the lowest permeability. The pores of each layer 2, 3, 4 initially comprise oil 5 (illustrated as—) and associated formation water 6.

Into the geological layers 1,2,3,4 an injection well 7 and an oil production well 8 are arranged. Injection water to which a trigger chemical is added (illustrated as ~+T) is injected into the injection well 7, penetrates the different layers 2,3,4 and forms water flooded regions 9 (where the pores of the formation are substantially filled with injection water (~+T). As a result of this water flooding process the oil 5 is pressed out of the layers 2,3,4 into the oil production well 8. The well fluid received in the production well from the layers 2 and 4 comprises oil and formation water.

In the permeable layer 3, the injection water (~+T) has however reached the oil production well 8, and therefore also contributes to the well fluid before application of the method of the present invention.

According to an embodiment of the method according to the invention, break-through of this injection water and trigger chemical (~+T) is detected by detection of the trigger chemical T in the well fluid stream 10, either downhole or after production to surface. Suitable trigger chemicals T are alkaline materials such as NaOH or KOH. As soon as this trigger chemical T is detected in the production well 8, production is stopped and a second fluid comprising a second, reactive, compound R is injected into the production well 8. This second compound R, which could be for example iron chloride, penetrates from the production well 8 into the geological layers 2,3,4. Suitably the quantity of second fluid is selected such that it is injected up to a few meters (suitably less than 10 m, e.g. 3 m) into the formation surrounding the production wellbore.

Upon contact with the first, trigger, compound T a chemical reaction T+R>B takes place resulting in a blocking compound B, which seals off the relevant layer 3 where breakthrough of injection water ~+T has occurred. The blocking compound B can in particular be a solid blocking compound, such as a salt precipitating in the pores of the permeable geological formation. For example, the trigger compound can be a cation, $Ca^{2+}$, and the second compound can be an anion, $HCO_3^-/CO_3^{2-}$, so that a salt, $CaCO_3$ is formed as clogging compound. In this example, since $Ca^{2+}$ can be found in most formation waters, the concentration thereof in the injection water has to exceed significantly the natural concentration in the formation water, so as to allow detection of $Ca^{2+}$ as the trigger component in the production well fluid above a certain concentration threshold, and in order to predominantly form the blocking compound in the most permeable geological layer.

Assume the driving fluid (~+T) has a relatively high mobility in the layer 3 where breakthrough occurs (e.g. a viscosity of 1 mPa·s=1 cP)/ and the oil (–) has a relatively low mobility in the oil-bearing layers 2,4 (e.g. a viscosity on 5 mPa·s). Suitably the second fluid has an intermediate mobility (e.g. a viscosity of 3 mPa·s) (assuming for simplicity that all permeabilities and in particular end-point relative permeabilities are identical. When the production in the wellbore 8 is resumed, the second fluid including the second compound will be expelled from the oil-bearing layers 2,4 near the wellbore 8. In the region. of the driving fluid break-through, mixing ('fingering') will occur between the injection water with trigger chemical and the second fluid with second, reaction, compound, so that a relatively thick seal layer can be formed. Depending on the reaction speed, it may me desired to stop or cut back production again so as to allow sufficient time for the sealing reaction to occur.

As the other layers 2 and 4 do not comprise the trigger chemical T in the region of the production well 8, there will not take place any reaction between the natural formation water 6 and the second reactive compound R injected into the production well. So the layers 2,4, which do not have a break-through of injection water ~+T, will not be shut-off since no blocking compound B is formed in the pores of these layers 2, 4 in the vicinity of the inflow region of the oil production well 8.

It will be understood that the injected water may be hot water and/or steam, and that instead of injecting water other driving fluids, such as a froth, foam, carbon dioxide and/or nitrogen containing fluid may also be provided with a trigger chemical T which reacts with a reactive chemical R to provide a third blocking chemical B in those regions of an inflow zone of an oil production where a breakthrough of driving fluid occurs.

The method according to the invention is particularly attractive for inhibiting breakthrough of injection water via one or more relatively permeable oil-bearing layers in a stratified oil-bearing formation in which different oil-bearing layers of different permeabilities are separated by substantially impermeable shale barriers.

In the method of the present invention several production wells can be arranged around an injection well, and breakthrough of driving fluid into any one of the production wells can be treated separately.

It is possible to add the trigger compound only to a limited quantity of driving fluid, suitably at the start of injection. In this way a slug of driving fluid with trigger compound penetrates through the highly permeable formation. Such a slug can be used in the same way as described hereinbefore to seal the highly permeable formation when the thickness and trigger concentration of the slug near the production well is sufficient.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

I claim:

1. A method for selectively reducing the permeability of one or more relatively permeable geological layers of an oil-bearing formation, to inhibit breakthrough of driving fluid from a driving fluid injection well via at least one of said layers into an oil production well, which method comprises the steps of:
   injecting a driving fluid comprising a first compound into the formation via the injection well wherein the first compound comprises an alkaline material;
   detecting the first compound in well fluid of the oil production well;
   upon detection, injecting a second compound, the second compound comprising iron ions, into the formation via the oil production well, to react with the first compound to form an insoluble salt in order to provide a flow restriction generated by a third compound which comprises a reaction product of the first and second compounds in at least one relatively permeable geological layer through which breakthrough of the driving fluid into the oil production well has occurred.

2. The method according to claim 1, wherein a second fluid comprising the second compound is injected via the production well, which second fluid has a mobility intermediate between the mobilities of the oil and of the driving fluid in the formation.

3. The method according to claim 1, wherein the first compound is inert relative to the compounds present in the oil-bearing formation.

4. The method according to claim 1, wherein the second compound comprises iron chloride.

5. The method according claim 4, wherein the second compound further comprises components selected from the group consisting of hydrochloric acid, corrosion inhibitor, and flocculent.

6. The method according to claim 1, wherein the first compound is encapsulated.

7. The method according to claim 1, wherein the oil-bearing formation comprises various oil-bearing layers having different permeabilities, which layers are separated by substantially impermeable layers, such as shale barriers, and wherein the method is applied to inhibit breakthrough of driving fluid into the production well via one or more relatively permeable oil-bearing layers.

8. The method of claim 1, wherein a spacer fluid is not injected into the production well between detection of the first compound and injection of the second compound.

9. The method of claim 1 wherein the second compound comprises a low molecular weight poly acryl amide.

10. The method of claim 1 wherein the second compound further comprises a partially hydrolyzed poly acryl amide.

11. A kit of compounds comprising a first compound for injection into a subsurface formation via an injection well which first compound can pass through the formation concurrently with a driving fluid wherein the first compound comprises an alkaline material, and a second compound for injection into the formation via a production well, the second compound comprising iron ions, which second compound can react with the first compound so as to form an insoluble salt reaction product in the formation which imposes a flow restriction.

12. The kit according to claim 11, wherein the first compound comprises an alkaline material and the second compound comprises iron chloride.

13. The kit according to claim 12, wherein the second compound further comprises components selected from the group consisting of hydrochloric acid, corrosion inhibitor, and flocculent.

14. The kit according to claim 11, wherein the first compound is encapsulated.

15. The kit according to claim 11 wherein the second compound further comprises a low molecular weight poly acryl amide.

16. The kit according to claim 11 wherein the second compound further comprises a partially hydrolyzed poly acryl amide.

* * * * *